A. H. MORGAN.
GAS METER.
APPLICATION FILED JAN. 9, 1911.
1,020,837.
Patented Mar. 19, 1912.
3 SHEETS—SHEET 1.
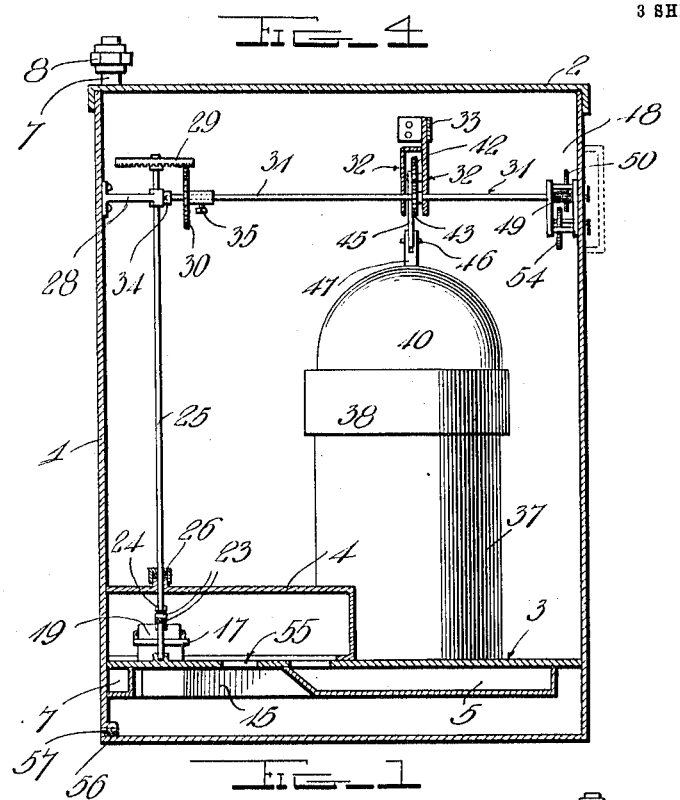
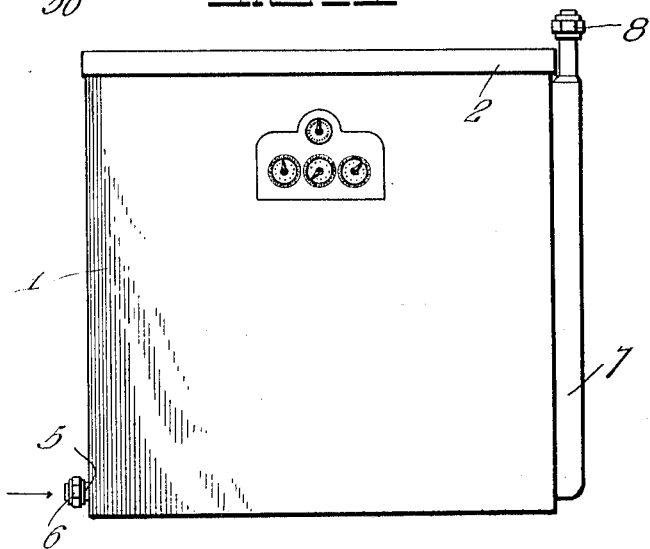
Witnesses
O. B. Hopkins
Inventor
A. H. Morgan
by H. B. Willson & Co.
Attorneys

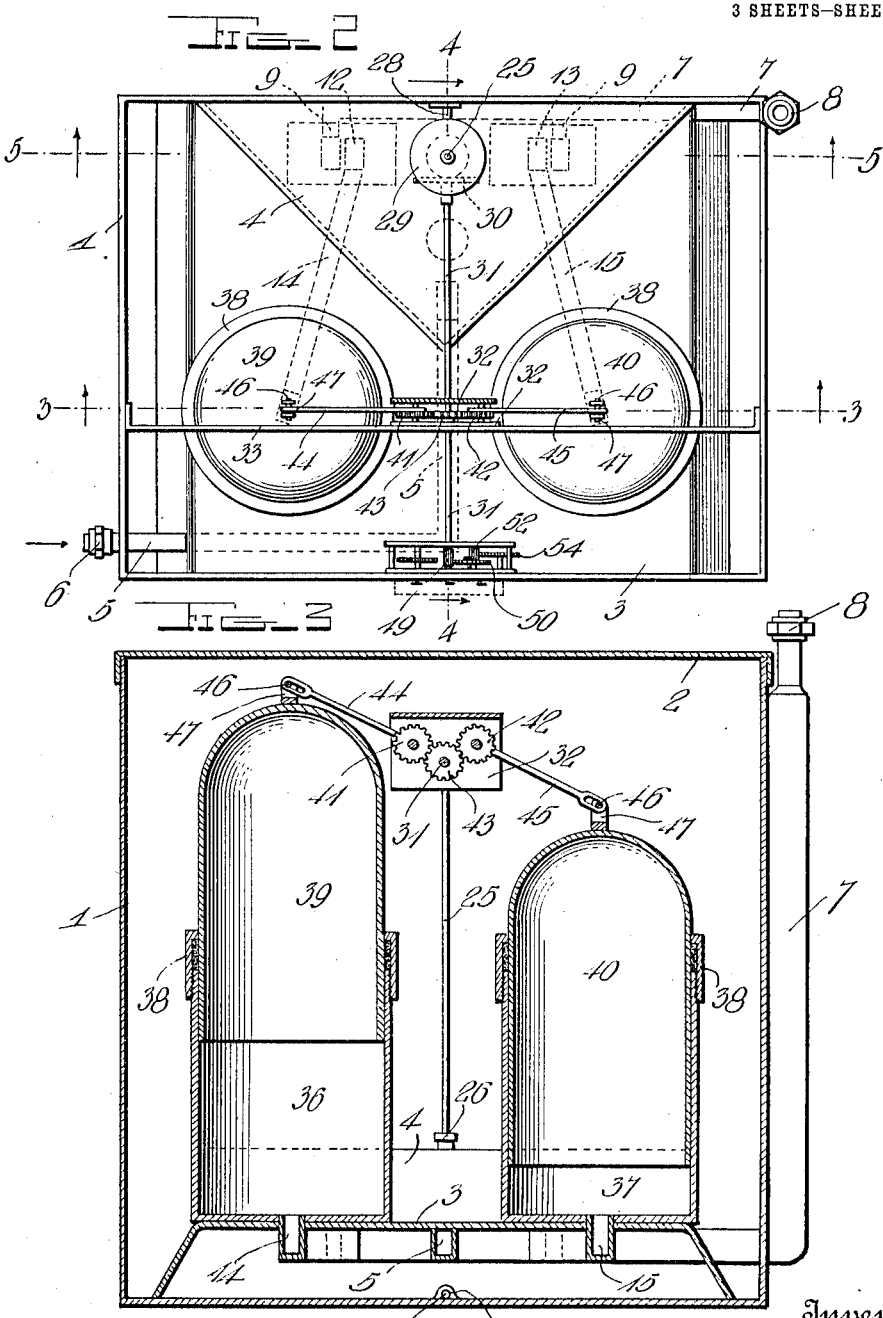

A. H. MORGAN.
GAS METER.
APPLICATION FILED JAN. 9, 1911.

1,020,837.

Patented Mar. 19, 1912.

3 SHEETS—SHEET 3.

Witnesses
O. B. Hopkins

Inventor
A. H. Morgan
by H. B. Willson & Co.
Attorneys

UNITED STATES PATENT OFFICE.

ARTHUR HENRY MORGAN, OF CAMBRIDGE, MASSACHUSETTS.

GAS-METER.

1,020,837.  Specification of Letters Patent.  Patented Mar. 19, 1912.

Application filed January 9, 1911. Serial No. 601,591.

*To all whom it may concern:*

Be it known that I, ARTHUR HENRY MORGAN, a citizen of the United States, residing at Cambridge, in the county of Middlesex and State of Massachusetts, have invented certain new and useful Improvements in Gas-Meters; and I do declare the following to be a full, clear, and exact description of the invention, such as will enable others skilled in the art to which it appertains to make and use the same.

This invention relates to improvements in gas meters.

One object of the invention is to provide a gas meter having an improved means for purifying the gas and removing therefrom any water or drip before the gas passes to the measuring mechanism of the meter.

Another object of the invention is to provide a gas meter having an improved construction and arrangement of automatically operated measuring devices whereby the quantity of gas passing through the meter is accurately measured.

Another object is to provide an improved means for accurately registering the amount of gas measured by the meter.

With these and other objects in view, the invention consists of certain novel features of construction, combination and arrangement of parts as will be more fully described and particularly pointed out in the appended claims.

In the accompanying drawings: Figure 1 is a front view of my improved meter; Fig. 2 is a top plan view with the cover of the meter casing removed; Fig. 3 is a vertical cross sectional view on the line 3—3 of Fig. 2; Fig. 4 is a central vertical cross section on the line 4—4 of Fig. 2; Fig. 5 is an enlarged sectional view of the lower portion of the meter on the line 5—5 of Fig. 2 showing the arrangement of the valves for controlling the flow of gas to and from the meter. Fig. 6 is a horizontal sectional view on the line 6—6 of Fig. 5 showing a top plan view of the valves; Fig. 7 is a view similar to and taken on the same line as Fig. 5 showing the valves in a different position; Fig. 8 is a vertical sectional view through the registering mechanism of the meter; Fig. 9 is a detail sectional view on the line 9—9 of Fig. 8 showing more clearly the arrangement of the pawl and ratchet mechanism whereby the registering mechanism is continuously operated in the same direction; Fig. 10 is a bottom plan view of the gear for transmitting the movement of the measuring device to the gas controlling valves.

Referring more particularly to the drawings, 1 denotes the casing of my improved meter, said casing having on its upper end a removable cover 2 and having in its lower end a false bottom 3, which is spaced a suitable distance above the main bottom of the meter as shown. Arranged on the false bottom 3 and connected to the rear wall of the meter casing is a triangular valve chamber 4. Arranged on the lower side of the false bottom 3 is a gas inlet tube 5 which extends through one side of the meter near the front of the same and is provided on its projecting end with a coupling 6. The tube 5 extends back beneath the bottom 3 to the center of the meter and thence extends rearwardly at a right angle and connects at its inner end with the compartment 4 near the front end thereof.

Arranged in the rear portion of the meter below the bottom 3 is a gas discharging tube 7, the outer end of which extends through the opposite side of the casing from that through which the inlet tube 5 projects and on the projecting end of the tube 7 is arranged a coupling 8. The tube 7 is connected at its inner portion by short branch tubes 9 with gas discharging ports or passages 10 and 11 formed in the false bottom 3 and opening into the chamber 4 near its opposite sides as shown. Arranged beside or adjacent to the ports 10 and 11 are combined gas inlet and discharge ports 12 and 13. The ports 12 and 13 are connected by gas conducting tubes 14 and 15 with gas measuring devices hereinafter described.

Over the ports 10 and 12 is arranged a valve seat 16 having formed therein passages which communicate with said ports. Over the ports 11 and 13 is arranged a valve seat 17 having passages which communicate with said ports. Slidably mounted on the valve seat 16 is a D valve 18 whereby the ports 10 and 14 are opened and closed. Slidably mounted on the valve seat 17 is a D valve 19 whereby the ports 11 and 13 are opened and closed. By thus arranging the valves 18 and 19 the flow of the gas through the ports and compartment 4 is controlled, said valves being automatically operated. The valves 18 and 19 are provided with guide stems 20 which slidably engage apertured guide lugs 21 arranged on the valve seats as shown. On the inner edges of the valves are formed upwardly projecting ears or studs 22 with which are connected the outer ends of pitman rods 23 the inner ends of which are connected to a crank 24 formed in the lower end of a vertically disposed valve operating shaft 25. The lower end of the shaft 25 projects through a stuffing box 26 formed in the top of the compartment 4 and has its lower end revolubly mounted in a step bearing 27 formed on the false bottom 3 as shown. It will be understood that the valves 18 and 19 and the operating devices connected thereto are arranged in the compartment 4 as clearly shown in the drawing.

The upper end of the shaft 25 is revolubly engaged with a bearing bracket 28 secured to the rear side of the casing near the upper end thereof as shown. On the upper end of the shaft 25 is fixedly mounted a shaft operating gear 29 with which is engaged a power transmitting gear 30. The gear 30 is adjustably mounted on a horizontal centrally disposed power transmitting shaft 31 which is revolubly mounted in bearing plates 32 secured to a transversely disposed cross bar 33 arranged in the upper portion of the casing as shown. The rear end of the shaft is revolubly engaged with a bearing socket 34 formed in the bearing bracket 28. The gear 30 is preferably provided with a hub having a set screw 35 by means of which the gear is adjustably secured to the shaft 31 whereby said gear may be adjusted for engagement with the gear 29 thus opening and closing the valves 18 and 19 at the proper time. By the employment of the gears 29 and 30 referred to, the machine can be accurately adjusted before the same is installed to compensate for the various inaccuracies that may be caused in its manufacture.

My improved gas measuring devices comprise gas receiving and discharging tanks 36 and 37 which are arranged on the false bottom 3 near the opposite sides thereof as shown. With the lower ends of the tanks 36 and 37 are respectively connected the gas conducting tubes 14 and 15 hereinbefore described. On the upper ends of the tanks 36 and 37 are arranged stuffing boxes 38 with which and with the tanks 36 and 37 are respectively engaged gas bells or inverted tanks 39 and 40. The bells 39 and 40 are alternately raised and lowered by the inlet and discharge of gas to and from the tanks 36 and 37. The rising and falling movement of the bells 39 and 40 caused by the filling and emptying of the tanks is communicated to the power transmitting shaft 31 through the medium of spur gears 41 and 42 which are revolubly mounted in the bearing plates 32 and are operatively engaged with a similar gear 43 fixedly mounted on said shaft as shown. The gears 41 and 42 have secured thereto laterally projecting crank arms 44 and 45 having slotted outer ends which are loosely connected to pivot pins 46 arranged in connecting lugs 47 secured to the upper ends of the bells 39 and 40 as shown. By thus connecting the bells 39 and 40 with the shaft 31 the latter will be turned first in one direction and then in the other as the bells rise and fall thereby oscillating the valve operating shaft, the movement of which is imparted to the valves 18 and 19 through pitman rods 23 connecting the same with the crank 24 of shaft 25 thereby alternately opening and closing the gas inlet and discharge ports at the proper time for admitting a fresh supply of gas to one tank while the gas from the other tank is being discharged as will be readily understood.

In order to register the quantity of gas passing through the meter I provide a suitable registering mechanism 48 comprising a spur gear pinion 49 which is fixedly mounted on the end of the shaft 31 adjacent to the front side of the meter and which is operatively engaged with a spur gear 50 loosely mounted on a short counter shaft 51 revolubly mounted in bearing plates 60 secured to the inner surface of the front side of the casing as shown. On the shaft 51 is also fixedly mounted a pinion 52 with which is engaged a spring projected pawl 53 carried by the gear 50 whereby when said gear is turned in a forward direction by the shaft 31 and pinion 49 said pinion 52 will be turned and whereby when said shaft 31 and pinion 49 are turned in a reverse direction the pawl 53 will play loosely over the teeth of the pinion 52 thus preventing a retrograde movement of the latter so that the train of registering gears 54 with which said pinion is engaged will always be driven in a forward direction. The registering gears 54 are connected with and adapted to operate the pointers of suitable indicating dials which are simply diagrammatically shown in the drawings as they form no part of the present invention.

In the false bottom 3 and communicating with the compartment 4 is a drip hole or passage 55 through which water or other impurities contained in the gas which is discharged in the compartment 4 through the gas inlet pipe 5 will pass and be caught in the space between the false bottom 3 and main bottom of the tank, said space thus forming a catch basin to receive the impurities which will settle from the gas while being held in the compartment 4 before passing through the ports 12 and 13 to the measuring tanks. The gas on entering the compartment 4 will also pass through the drip hole 55 into the space or catch basin below the false bottom 3 and will circulate therein and will be thus further retained and the impurities permitted to settle therefrom. It will be noted that the valve seats 16 and 17 project a suitable distance above the false bottom 3 forming the floor of the compartment 4 so that the water, drip or other impurities settling from the gas upon said floor will be positively prevented from passing into the gas inlet and discharge ports and said water or impurities will flow through the passage or hole 55 into the space or catch basin below the false bottom from which space the same is drained through a suitable drain passage 56 formed in the rear side of the meter casing and which is normally closed by a screw plug 57 or other suitable stopper.

If in the course of time the gas controlling valves of the meter become worn they may be removed and ground in any suitable manner thus permitting further use of the same.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim is:

1. A gas meter having arranged therein, a gas receiving compartment, a drip compartment arranged below the latter into which the gas is directly introduced whereby the water and drip settling from the gas in said receiving compartment are caught, and a gas measuring mechanism adapted to receive and measure the gas after the said impurities have been removed therefrom.

2. A gas meter having arranged in its lower end a false bottom adapted to form a catch basin and into which the gas is directly introduced, said bottom having formed therein a drip passage, a gas receiving chamber arranged on said false bottom over the drip passage therein, a gas inlet tube connected with said chamber whereby the gas entering the same will be caught and held while the water and drip settle therefrom and pass through said drip passage into said catch basin, and a gas measuring mechanism adapted to receive and measure the gas after the same has been purified in said chamber and catch basin.

3. A gas meter having arranged therein a gas purifying mechanism adapted to receive the gas entering the meter, expansible gas measuring tanks arranged in said meter and adapted to be automatically operated by the entrance and discharge of the gas, valves adapted to control the flow of gas from said purifying mechanism to said measuring tanks, and means operated by the vertical movement of said tanks to open and close said valves at the proper time.

4. A gas meter having arranged therein a gas purifying mechanism comprising a receiving chamber and a catch basin, gas measuring tanks arranged in said meter, gas bells operatively engaged with said tanks and adapted to be raised and lowered by the pressure of the gas passing into and out of said tanks, gas controlling valves arranged in said gas receiving chamber and adapted to control the flow of gas from said chamber to said measuring tanks, an adjustable valve operating mechanism actuated by the movement of said gas bells whereby said valves are opened and closed at the proper time for admitting a fresh supply of gas to first one and then the other of said tanks, and a registering mechanism actuated by the movement of said gas bells.

5. A gas meter having arranged therein a gas purifying mechanism comprising a receiving and settling chamber and a catch basin adapted to receive the water and impurities settling from the gas in said chamber, said chamber having formed therein gas inlet and discharge ports, valve seats arranged over said ports, said seats being elevated a suitable distance above the bottom of the chamber whereby the water and drip from the gas are prevented from entering said ports, valves slidably mounted on said seats and adapted to open and close said ports, gas measuring tanks arranged in the meter, gas bells slidably mounted in said tanks and having a gas tight engagement therewith, said bells being adapted to rise and fall when the gas is let into and discharged from said tank, gas conducting tubes to connect said tanks with the gas discharge ports in said gas receiving chamber, a valve operating shaft revolubly mounted in said chamber, means to operatively connect said shaft with said valves, a gear fixedly mounted on the upper end of said shaft, a power transmitting shaft revolubly mounted in said meter, a power transmitting gear adjustably mounted on said shaft and having an adjustable engagement with the gear on said valve operating shaft and means operated by the movement of said gas bells to oscillate said power transmitting shaft thereby turning said valve operating shaft first in one direction and then the other thus alternately opening and closing said valves.

6. A gas meter having arranged therein a gas receiving and supporting chamber and a catch basin, said chamber having formed therein gas inlet and discharge ports, valves slidably engaged with said ports whereby the same are opened and closed, gas measuring tanks arranged in said meter, gas conducting tubes to connect the discharge ports in said gas receiving chamber with said tanks, a gas discharge pipe connected with the ports in said chamber whereby said valves are adapted to control the flow of gas to and from said tanks, a valve operating shaft revolubly mounted at its lower end in said gas chamber, a crank formed on the lower end of said shaft, pitman rods to connect said crank with said valves whereby the latter are alternately opened and closed, a gear fixedly mounted on the upper end of said shaft, a power transmitting shaft arranged in the upper portion of said meter, a power transmitting gear adjustably mounted on said shaft and having an adjustable engagement with the gear on said valve operating shaft, an operating gear fixedly mounted on said power transmitting shaft, drive gears operatively engaged with the gear on said power transmitting shaft, gas bells having a gas tight connection with said tanks and adapted to be raised and lowered by the entrance and discharge of the gas to and from said tanks, crank arms fixedly connected at their inner ends to said drive gears and having a loose connection at their outer ends with said bells whereby said drive gears are turned by the rising and falling movement of the bells and said motion is imparted to said power transmitting shaft.

7. A gas meter having arranged in its lower end a false bottom adapted to form a catch basin, said bottom having formed therein a drip passage and gas receiving and discharging ports, valve seats arranged over said ports and projecting above said false bottom whereby the water or drip settling from said gas are prevented from entering said ports, a gas receiving and settling chamber arranged on said false bottom over said ports and passages, a gas inlet tube arranged below said false bottom and opening into said chamber, a gas discharge tube arranged below said false bottom and connecting with said discharge ports, valves arranged in said chamber and having a sliding engagement with said valve seats whereby said ports are opened and closed, a gas measuring mechanism adapted to receive the gas from said chamber, means whereby said valves are operated by the movement of said measuring mechanism and a registering mechanism operatively connected with said measuring mechanism.

8. A gas meter having arranged therein a gas purifying mechanism comprising a receiving and settling chamber and a catch basin, gas measuring tanks connected with said chamber, valves arranged in said chamber to control the flow of gas therefrom to said tanks, gas bells operatively engaged with said tanks and adapted to be raised and lowered by the pressure of gas passing into and out of the tanks, an operating shaft connected to said valves, a power transmitting shaft operatively connected to said valve operating shaft, means to connect said bells with said power transmitting shaft whereby the latter is oscillated or turned first in one direction and then in the other, a registering mechanism comprising a train of gears, a pinion fixedly mounted on said power transmitting shaft, a loosely mounted gear operatively engaged with said pinion and a pawl carried by said gear and adapted to engage one of the gears of said train whereby the gears of the latter will be continuously driven in one direction by said power transmitting shaft.

In testimony whereof I have hereunto set my hand in presence of two subscribing witnesses.

ARTHUR HENRY MORGAN.

Witnesses:
HAROLD STEPHEN ANDREWS,
JOHN BELMONT CRONK.

---

Copies of this patent may be obtained for five cents each, by addressing the "Commissioner of Patents, Washington, D. C."